(12) United States Patent
Yue et al.

(10) Patent No.: US 12,231,943 B2
(45) Date of Patent: Feb. 18, 2025

(54) INFORMATION PROCESSING METHOD AND TERMINAL

(71) Applicant: VIVO MOBILE COMMUNICATION CO., LTD., Guangdong (CN)

(72) Inventors: Ran Yue, Guangdong (CN); Xiaodong Yang, Guangdong (CN); Xueming Pan, Guangdong (CN); Boubacar Kimba Dit Adamou, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 307 days.

(21) Appl. No.: 17/577,837

(22) Filed: Jan. 18, 2022

(65) Prior Publication Data
US 2022/0141699 A1 May 5, 2022

Related U.S. Application Data

(63) Continuation of application No. PCT/CN2020/102743, filed on Jul. 17, 2020.

(30) Foreign Application Priority Data

Jul. 18, 2019 (CN) .......................... 201910651712.2

(51) Int. Cl.
| | |
|---|---|
| *H04W 28/00* | (2009.01) |
| *H04W 8/24* | (2009.01) |
| *H04W 28/02* | (2009.01) |
| *H04W 28/18* | (2009.01) |
| *H04W 48/04* | (2009.01) |

(Continued)

(52) U.S. Cl.
CPC ........ *H04W 28/0215* (2013.01); *H04W 8/24* (2013.01); *H04W 28/18* (2013.01); *H04W 48/04* (2013.01); *H04W 72/51* (2023.01); *H04W 88/06* (2013.01)

(58) Field of Classification Search
None
See application file for complete search history.

(56) References Cited

U.S. PATENT DOCUMENTS

| | | | |
|---|---|---|---|
| 2015/0373614 A1 | 12/2015 | Tie et al. | |
| 2016/0157228 A1* | 6/2016 | Yum | .............. H04L 5/0007 370/329 |
| 2018/0092156 A1 | 3/2018 | Kim et al. | |

(Continued)

FOREIGN PATENT DOCUMENTS

| | | |
|---|---|---|
| CN | 1867131 A | 11/2006 |
| CN | 101772191 A | 7/2010 |

(Continued)

OTHER PUBLICATIONS

High level aspects on SDR requirements, 3GPP TSG RAN WG4 Meeting #8, Aug. 20-24, 2018, R4-1810471, NTT Docomo, Inc., Gothenburg, Sweden.

(Continued)

*Primary Examiner* — Gerald A Smarth
(74) *Attorney, Agent, or Firm* — IP & T GROUP LLP (57) ABSTRACT

An information processing method includes: sending first capability information to the network side device, where the first capability information includes a first capability and time division multiplexing information associated with the first capability.

20 Claims, 3 Drawing Sheets

Send first capability information to a network side device, where the first capability information includes a first capability and time division multiplexing information associated with the first capability — 201

(51) Int. Cl.
  *H04W 72/51* (2023.01)
  *H04W 88/06* (2009.01)

(56) References Cited

U.S. PATENT DOCUMENTS

| | | | | |
|---|---|---|---|---|
| 2018/0227094 | A1* | 8/2018 | Liu | H04B 7/06966 |
| 2019/0110329 | A1* | 4/2019 | Tang | H04W 72/542 |
| 2020/0120647 | A1 | 4/2020 | Zhang et al. | |
| 2021/0028823 | A1* | 1/2021 | Park | H04W 80/02 |
| 2021/0037481 | A1* | 2/2021 | Kim | H04W 72/54 |
| 2022/0271809 | A1* | 8/2022 | Raghavan | H04B 7/0632 |

FOREIGN PATENT DOCUMENTS

| | | |
|---|---|---|
| CN | 102469611 A | 5/2012 |
| CN | 104170486 A | 11/2014 |
| CN | 105792096 A | 7/2016 |
| CN | 108650672 A | 10/2018 |
| CN | 108811088 A | 11/2018 |
| EP | 3454610 A1 | 3/2019 |
| JP | 2014179897 A | 9/2014 |
| JP | 2015222972 A | 12/2015 |
| JP | 2019092046 A | 6/2019 |
| WO | WO-2011109989 A1 * | 9/2011 ........ H04W 36/0055 |
| WO | 2012088928 A1 | 7/2012 |
| WO | WO-2018040971 A1 * | 3/2018 ........... H04L 41/082 |

OTHER PUBLICATIONS

The First Office Action of Priority Application No. CN 201910651712.2 issued by the Chinese Patent Office on Apr. 7, 2021.
The Second Office Action of Priority Application No. CN 201910651712.2 issued by the Chinese Patent Office on Sep. 24, 2021.
International Search Report and Written Opinion of Priority Application No. PCT/CN2020/102743 issued by the Chinese Patent Office on Oct. 21, 2020.
Vodafone, FDD and TDD Timing Alignment for Dual Connectivity, 3GPP TSg RAN WG2 Meeting #105 bis, Apr. 8-12, 2019, R2-1904299, Xi'An, People's Republic of China.
ZTE et al., PHR report for the UE do not support dynamic power sharing, 3GPP TSG RAN WG2 Meeting #101bis, Apr. 16-20, 2018, R2-1804406, Sanya, China.
Extended European Search Report for European Patent Application No. 20840328.7 issued by the European Patent Office on Jul. 5, 2022.
Office Action for the Japanese Patent Application No. 2022-502543 issued by the Japanese Patent Office on Jan. 10, 2023.

* cited by examiner

FIG. 1

| Send first capability information to a network side device, where the first capability information includes a first capability and time division multiplexing information associated with the first capability | ⟋ 201 |

FIG. 2

| Receive first capability information sent by a terminal, where the first capability information includes a first capability and time division multiplexing information associated with the first capability | ⟋ 301 |

INFORMATION PROCESSING METHOD AND TERMINAL

CROSS-REFERENCE TO RELATED APPLICATIONS

This application is a Bypass Continuation Application of PCT/CN2020/102743 filed on Jul. 17, 2020, which claims priority to Chinese Patent Application No. 201910651712.2 filed on Jul. 18, 2019, which are incorporated herein by reference in their entirety.

TECHNICAL FIELD

Embodiments of the present disclosure relates to the field of communications technologies, and in particular, to an information processing method, a terminal, and a network side device.

BACKGROUND

Usually, in a mobile communications system, a terminal reports capabilities of the terminal in a process of attaching, and the capabilities of the terminal includes a capability of an air interface of the terminal and a capability of a core network of the terminal. After a successful attachment, if the terminal needs to change the capabilities of the terminal, it can be achieved either through a procedure of detaching/reattaching or by reporting updated capabilities of the terminal after a network searches terminal capabilities again.

At present, terminal capabilities reported/updated by a terminal are maximum terminal capabilities supported currently by the terminal, and there lacks alternative manners of reporting terminal capabilities.

SUMMARY

According to a first aspect, an embodiment of the present disclosure provides an information processing method applied to a terminal. The method includes:
  sending first capability information to a network side device, where the first capability information includes a first capability and time division multiplexing information associated with the first capability.

According to a second aspect, an embodiment of the present disclosure provides an information processing method applied to a network side device. The method includes:
  receiving first capability information sent by a terminal, where the first capability information includes a first capability and time division multiplexing information associated with the first capability.

According to a third aspect, an embodiment of the present disclosure further provides a terminal. The terminal includes:
  a first sending module, configured to send first capability information to a network side device, where the first capability information includes a first capability and time division multiplexing information associated with the first capability.

According to a fourth aspect, an embodiment of the present disclosure further provides a network side device, including:
  a third receiving module, configured to receive first capability information sent by a terminal, where the first capability information includes a first capability and time division multiplexing information associated with the first capability.

According to a fifth aspect, an embodiment of the present disclosure further provides a terminal. The terminal includes a processor, a memory, and a computer program stored in the memory and executable on the processor, and when the computer program is executed by the processor, the steps of the information processing method described above are implemented.

According to a sixth aspect, an embodiment of the present disclosure further provides a network side device. The network side device includes a processor, a memory, and a computer program stored in the memory and executable on the processor, and when the computer program is executed by the processor, the steps of the information processing method described above are implemented.

According to a seventh aspect, an embodiment of the present disclosure further provides a non-transitory computer-readable storage medium. The non-transitory computer-readable storage medium stores a computer program, where when the computer program is executed by a processor, the steps of the foregoing information processing method applied to a terminal or steps of the foregoing information processing method applied to a network side device are implemented.

BRIEF DESCRIPTION OF THE DRAWINGS

To describe the technical solutions in embodiments of the present disclosure more clearly, the following briefly describes the accompanying drawings for describing the embodiments of the present disclosure. Apparently, the accompanying drawings in the following descriptions show merely some embodiments of the present disclosure, and a person of ordinary skill in the art may still derive other drawings from these accompanying drawings.

DETAILED DESCRIPTION OF EMBODIMENTS

The technical solutions in embodiments of the present disclosure are described below clearly with reference to the accompanying drawings in the embodiments of the present disclosure. Clearly, the described embodiments are some rather than all of the embodiments of the present disclosure. All other embodiments obtained by a person of ordinary skill in the art based on the embodiments of the present disclosure shall fall within the protection scope of the present disclosure.

Terms "first" and "second" in this application are used to distinguish similar objects, and do not need to be used to describe a specific order or sequence. In addition, terms "include", "have", and any variants thereof are intended to cover non-exclusive inclusion, for example, processes, methods, systems, products, or devices that contain a series of steps or units are not necessarily limited to those steps or units that are clearly listed, but may include other steps or units that are not clearly listed or are inherent to these processes, methods, products, or devices. In addition, "and/or" used in this application means at least one of the connected objects. For example, A and/or B and/or C represents the following seven cases: Only A exists, only B exists, only C exists, both A and B exist, both B and C exist, both A and C exist, or A, B, and C all exist.

Figure 1:
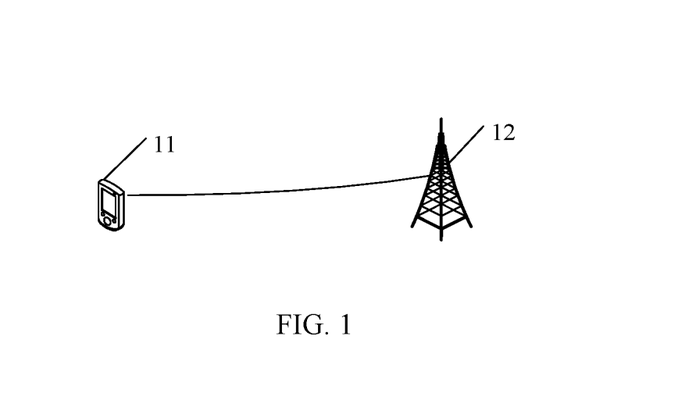
FIG. 1 is a structural diagram of a network system to which embodiments of the present disclosure can be applied.

Refer to FIG. 1. FIG. 1 is a structural diagram of a network system applicable to an embodiment of the present disclosure. As shown in FIG. 1, the network system includes a terminal 11 and a network side device 12. Communication may be performed between the terminal 11 and the network side device 12.

In this embodiment of the present disclosure, the terminal 11 may also be referred to as user equipment (UE). In actual application, the terminal 11 may be a mobile phone, a tablet personal computer, a laptop computer, a personal digital assistant (PDA), a mobile Internet device (MID), a wearable device, a vehicle-mounted device, or the like. The network side device 12 may be a base station, a core network, a relay, an access point, or the like.

The following describes the information processing method in the embodiments of the present disclosure.

Figure 2:
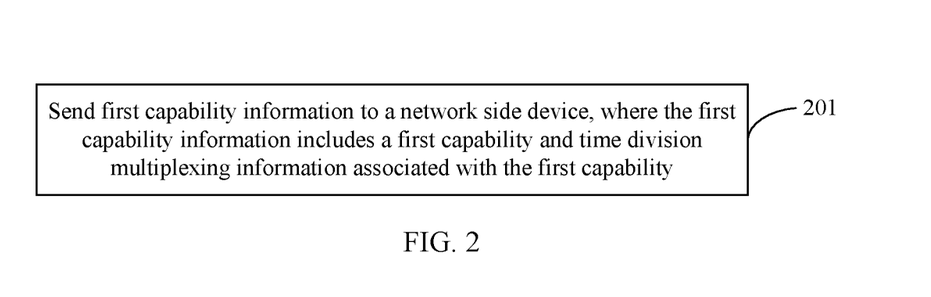
FIG. 2 is a first flowchart of an information processing method according to an embodiment of the present disclosure.

Refer to FIG. 2. FIG. 2 is a first flowchart of an information processing method according to an embodiment of the present disclosure. The information processing method shown in FIG. 2 is applied to a terminal.

As shown in FIG. 2, the information processing method applied to the terminal may include the following steps:

Step 201: sending first capability information to a network side device, where the first capability information includes a first capability and time division multiplexing information associated with the first capability.

In specific implementation, the time division multiplexing (TDM) information associated with the first capability may be used to indicate information related to the first capability on different time domain resources, for example, a level of the first capability, a strength of the first capability, or a magnitude of the first capability. In specific implementation, the TDM information may be embodied as a TDM pattern, but a specific embodiment form of the TDM information is not limited in this embodiment of the present disclosure.

For ease of understanding, an example of a MIMO capability is used for description. A TDM pattern associated with the MIMO capability may indicate that a relatively low MIMO capability (such as two layers (Layer)) is used at symbols 1, 2, and 3, and a relatively high MIMO capability (four layers) is used at symbols 4, 5, and 6.

It can be learned that in this embodiment, information related to the first capability that is reported by the terminal and that is on different time domain resources may be different. While in a related technology, a terminal only reports a highest capability currently supported, this can achieve a higher flexibility in reported content of capabilities and further, there is a higher flexibility in adopting a manner of reporting a capability.

In this embodiment, optionally, the first capability information includes at least one of: capability information of the terminal; cell group capability information of the terminal; working frequency (also referred to as a working frequency point) capability information of the terminal; or working band capability information of the terminal.

In this optional implementation, the sending first capability information to a network side device may specifically be embodied as: sending capability information about a target object to the network side device, where the target object includes at least one of: the terminal, the cell group of the terminal; the working frequency of the terminal; or the working band of the terminal.

When the terminal is configured with dual connectivity, the capability information about the cell group of the terminal includes at least one of: master cell group (MCG) capability information of the terminal; or secondary cell group (SCG) capability information of the terminal.

Further, the capability information about the target object may be: a highest capability currently supported by the target object, a capability of the target object expected (or suggested) by the terminal, or information about a capability adjustment of the target object expected by the terminal.

Specifically, capability information about UE may be: a highest capability currently supported by the UE, a capability of the UE expected by the UE, or information about a capability adjustment of the UE expected by the UE.

Capability information about an MCG of UE may be: a highest capability currently supported by the MCG, a capability of the MCG expected by the UE, or information about a capability adjustment of the MCG expected by the UE.

Capability information about an SCG of UE may be: a highest capability currently supported by the SCG, a capability of the SCG expected by the UE, or information about a capability adjustment of the SCG expected by the UE.

Capability information about a working frequency of UE may be: a highest capability currently supported by the working frequency, a capability of the working frequency expected by the UE, or information about a working frequency capability adjustment expected by the UE.

Capability information about a working band of UE may be: a highest capability currently supported by the working band, a capability of the working band expected by the UE, or information about a working band capability adjustment expected by the UE.

In addition, the first capability in this embodiment may include at least one of capabilities supported by the target object. Optionally, the first capability may include at least one of: a multi-radio access technology dual connectivity (MRDC) capability; a new radio (NR) capability; an evolved universal mobile telecommunications system terrestrial radio access (EUTRA) capability; a multi-input multi-output (MIMO) capability; a carrier aggregation (CA) capability; or a modulation order capability.

In this embodiment, the terminal may autonomously send the first capability information to the network side device, or may send the first capability information to the network side device based on an indication of the network side device. The specific description is as follows:

In a first case, the terminal autonomously sends the first capability information to the network side device.

It should be noted that, an occasion for the terminal to report the first capability information is not limited in the first case. In specific implementation, the terminal may autonomously report the first capability information in a process of attaching; or may autonomously report the first capability information after a successful attachment. In this way, while in a related technology, after a successful attachment, a change of terminal capabilities can be achieved either through a procedure of detaching/reattaching or by UE reporting updated UE capabilities after a network searches UE capabilities again, this embodiment can improve a flexibility of reporting the first capability information autonomously by the terminal.

In the first case, optionally, that the first capability information is sent to the network side device includes: in a case that a first trigger condition is satisfied, the first capability information is sent to the network side device. In other words, the terminal may autonomously send the first capability information to the network side device by using a trigger condition.

For example, the first trigger condition may include at least one of:

that the terminal activates a multi-card operation;
that a working manner of N cards in the multi-card operation is changed, in a case that the terminal performs the multi-card operation, where N is a positive integer, and N is less than or equal to number of cards in the multi-card operation;
that a status of M cards in the multi-card operation is switched to a disabled state, in a case that the terminal performs the multi-card operation, where M is a positive integer, and M is less than or equal to the number of cards in the multi-card operation; or
that a period for reporting the capability information has arrived.

In a case that UE is mounted with a plurality of communications cards, if two or more communications cards of the terminal are in an activated state, namely, a communication-capable state, it may be considered that the terminal activates a multi-card operation.

In specific implementation, a communications card mounted onto the UE may be a universal subscriber identity module (USIM) or a subscriber identity module (SIM). In addition, the communications cards mounted onto the UE may be from a same or different mobile network operator (MNO).

A terminal mounted with a plurality of communications cards may trigger reporting of the first capability information through events below.

In a first implementation, when the terminal activates a multi-card operation, for example, UE activates the second card or the third card, a capability of the terminal may be changed. Therefore, the terminal may autonomously send the first capability information to the network side device.

In a second implementation, when the terminal activates a multi-card operation, a working manner of N cards in the multi-card operation is changed, where for example, a card in the multi-card operation originally works in an LTE network in a single-leg manner, and then E-UTRA NR dual connectivity with an MCG using E-UTRA and an SCG using NR (EN-DC) is activated; or conversely, a capability of the terminal may be changed, and therefore, the terminal may autonomously send the first capability information to the network side device.

In a third implementation, when the terminal activates a multi-card operation, a status of M cards in the multi-card operation is switched to a disabled state, where for example, UE disables at least one card in the multi-card operation, and in this case, a capability of the terminal may be changed. Therefore, the terminal may autonomously send the first capability information to the network side device.

In the foregoing three implementations, a highest capability supported by a target object may have a change very likely. Therefore, the terminal autonomously reports the first capability information, namely, capability information about the target object, to update a capability of the target object, thereby guaranteeing a service quality of the terminal, for example, guaranteeing a continuity of terminal services. In addition, power consumption of the terminal may be further reduced, or reliability of service transmission may be improved.

In addition, the terminal may report the first capability information periodically. In this implementation, the terminal may autonomously send the first capability information to the network side device when a period for reporting the first capability information has arrived. It should be understood that this implementation may be applied to a terminal mounted with a plurality of cards, or may be applied to a terminal mounted with a single card.

In the foregoing first case, the terminal may automatically report the first capability information under many conditions. While in a related technology, after a successful attachment, if UE needs to change UE capabilities, it can be achieved either through a procedure of detaching or reattaching or by UE reporting updated UE capabilities after a network searches UE capabilities again, this embodiment can improve a flexibility of reporting the first capability information.

In a second case, the terminal sends the first capability information to the network side device based on an indication of the network side device.

In the second case, before the first capability information is sent to the network side device, the method further includes:

receiving first indication information sent by the network side device.

In specific implementation, in a case that a second trigger condition is satisfied, the network side device may send the first indication information to the terminal.

For example, the second trigger condition may include at least one of:

that the terminal activates a multi-card operation is acquired;
that a working manner of N cards in the multi-card operation is changed, in a case that the terminal performs the multi-card operation is acquired, where N is a positive integer, and N is less than or equal to number of cards in the multi-card operation;
that a status of M cards in the multi-card operation is switched to a disabled state, in a case that the terminal performs the multi-card operation is acquired, where M is a positive integer, and M is less than or equal to the number of cards in the multi-card operation; or
that a period for delivering the first indication information has arrived.

Determining of whether the second trigger condition is satisfied is similar to determining of whether the first trigger condition is satisfied. Therefore, reference may be made to related descriptions of satisfying the first trigger condition, and this is not limited herein again.

In addition, when acquiring or considering that the capability information of the terminal is updated, the network side device may send the first indication information the terminal.

It can be learned from the foregoing content that there may be a plurality of types of trigger conditions for the network side device to deliver the first indication information, and for delivery of the first indication information triggered by different trigger conditions, the first indication information may be used differently.

Optionally, the first indication information is used for:
searching capability information;
searching capability update information;
instructing the terminal to report the capability information;
indicating that the terminal is allowed to update the capability information; or
instructing the terminal to update the capability information.

In specific implementation, the first indication information delivered by the network side device in a case that the second trigger condition is satisfied may be used for: searching capability information; instructing the terminal to report the capability information; indicating that the terminal is allowed to update the capability information; or instructing the terminal to update the capability information.

The first indication information delivered when the network side device acquires or considers that the capability information of the terminal is updated may be used for: searching capability information; searching capability update information; or instructing the terminal to report the capability information.

Optionally, in a case that the first indication information is used for instructing the terminal to update the capability information, the first indication information is further used to indicate second capability information expected by the network side device, where the second capability information includes a second capability and time division multiplexing information associated with the second capability.

In actual application, the first capability information may be the same as or different from the second capability information.

It can be learned from the foregoing content that there are a plurality of manners of embodying the capability information about the target object, which may specifically be: a highest capability currently supported by the target object, a capability of the target object expected by the terminal, or information about a capability adjustment of the target object expected by the terminal. In the second case, the terminal reports the first capability information based on the first indication information delivered by the network side device. Therefore, a specific manner of embodying the capability information about the target object may be related to use of the first indication information.

For example, in a case that the first indication information is used for searching capability information or instructing the terminal to report capability information, the capability information about the target object may be embodied as the highest capability currently supported by the target object.

In a case that the first indication information is used for searching capability update information, the capability information about the target object may be embodied as the highest capability currently supported by the target object or the information about a capability adjustment of the target object.

In a case that the first indication information is used for indicating that the terminal is allowed to update the capability information, the capability information about the target object may be embodied as: the capability of the target object expected by the terminal, or the information about a capability adjustment of the target object expected by the terminal.

In a case that the first indication information is used for instructing the terminal to update the capability information, the capability information about the target object may be embodied as: the capability of the target object expected by the terminal, or the information about a capability adjustment of the target object expected by the terminal.

In this embodiment, optionally, after the first capability information is sent to the network side device, the method further includes:
receiving second indication information sent by the network side device, wherein
the second indication information is used for instructing the network side device to accept or reject some or all information in the first capability information.

Optionally, the second indication information is further used for instructing the terminal to perform a capability update operation.

In specific implementation, in a case that the second indication information is used only for instructing the network side device to accept or reject some or all information in the first capability information, the second indication information may explicitly indicate the network side device to accept or reject some or all information in the first capability information, and the second indication information may be acknowledgment information.

In a case that the second indication information is used for instructing the network side device to accept or reject some or all information in the first capability information, and the terminal performs the capability update operation, the second indication information may be embodied in the following two manners:

In a first embodying manner, the second indication information is update indication information. In this case, the second indication information explicitly indicates the terminal to perform the capability update operation, and implicitly indicates the network side device to accept or reject some or all information in the first capability information.

In a second embodying manner, the second indication information includes acknowledgment information and update indication information. In this case, the second indication information explicitly indicates the network side device to accept or reject some or all information in the first capability information, and explicitly indicates the terminal to perform the capability update operation. For example, the acknowledgment information explicitly indicates the network side device to accept or reject some or all information in the first capability information, and the update indication information explicitly indicates the terminal to perform the capability update operation.

Optionally, after the second indication information sent by the network side device is received, the method further includes:
performing the capability update operation based on the second indication information.

In specific implementation, in an implementation, the terminal may update some or all information that is in the first capability information and that is received by the network side device.

In another implementation, in a case that the second indication information is used for instructing the terminal to perform the capability update operation, the second indication information may indicate capability update information, where the capability update information may be within a capability range of the first capability information, or may be within a greatest capability range of a plurality of pieces of first capability information reported by the terminal. In this case, the terminal may perform updating based on the capability update information.

Figure 3:
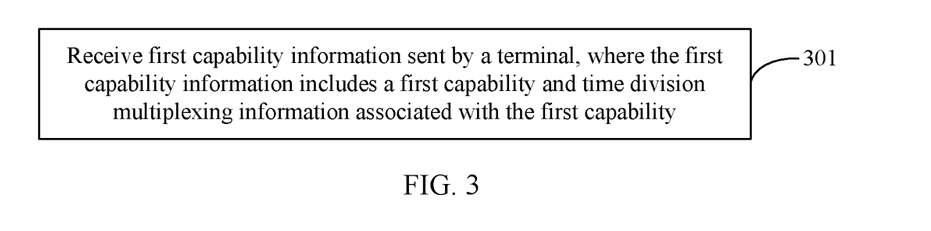
FIG. 3 is a second flowchart of an information processing method according to an embodiment of the present disclosure.

Refer to FIG. 3. FIG. 3 is a first flowchart of an information processing method according to an embodiment of the present disclosure. The information processing method in this embodiment of the present disclosure is applied to a network side device.

As shown in FIG. 3, the information processing method applied to the network side device may include the following steps:

Step 301: receiving first capability information sent by a terminal, where the first capability information includes a first capability and time division multiplexing information associated with the first capability.

Optionally, before the receiving first capability information sent by a terminal, the method includes:
sending first indication information to the terminal.

Optionally, the sending first indication information to the terminal includes:
in a case that a second trigger condition is satisfied, sending the first indication information to the terminal.

Optionally, the second trigger condition may include at least one of:
that the terminal activates a multi-card operation is acquired;
that a working manner of N cards in the multi-card operation is changed, in a case that the terminal performs the multi-card operation is acquired, where N is a positive integer, and N is less than or equal to number of cards in the multi-card operation;
that a status of M cards in the multi-card operation is switched to a disabled state, in a case that the terminal performs the multi-card operation is acquired, where M is a positive integer, and M is less than or equal to the number of cards in the multi-card operation; or
that a period for delivering the first indication information has arrived.

Optionally, the first indication information is used for instructing any one of the following:
searching capability information;
searching capability update information;
instructing the terminal to report the capability information;
indicating that the terminal is allowed to update the capability information; or
instructing the terminal to update the capability information.

Optionally, in a case that the first indication information is used for instructing the terminal to update the capability information, the first indication information is further used to indicate second capability information expected by the network side device, where the second capability information includes a second capability and time division multiplexing information associated with the second capability.

Optionally, after the receiving first capability information sent by a terminal, the method further includes:
sending second indication information to the terminal, wherein
the second indication information is used for instructing the network side device to accept or reject some or all information in the first capability information.

Optionally, the second indication information is further used for instructing the terminal to perform a capability update operation.

Optionally, the first capability information includes at least one of:
capability information of the terminal;
cell group capability information of the terminal;
working frequency capability information of the terminal; or
working band capability information of the terminal.

Optionally, the first capability includes at least one of: a multi-radio access technology dual connectivity capability; a new radio capability; an evolved universal mobile telecommunications system terrestrial radio access capability; a multi-input multi-output capability; a carrier aggregation capability; or a modulation order capability.

It should be noted that this embodiment serves as an implementation of the network side device corresponding to the foregoing method embodiment. Therefore, reference may be made to related descriptions in the foregoing method embodiment, and same beneficial effects can be achieved. To avoid repeated descriptions, details are not described herein again.

It should be noted that the various optional implementations described in this embodiment of the present disclosure may be implemented in combination with each other, or may be implemented separately, which is not limited in this embodiment of the present disclosure.

Embodiment 1: UE actively updates/reports a UE capability.

Step 1: The UE actively reports the UE capability after an initial access phase or an access.

The UE capability includes a TDM pattern+a MIMO capability (lower or higher), a TDM pattern+a CA capability, a TDM pattern+a modulation order, and the like, which includes, but is not limited to, a combination of a TDM pattern and a UE capability in a related technology.

The UE capability may be a highest capability currently supported by the UE, a capability of the UE suggested by the UE, or a change of the UE capability suggested by the UE.

Optionally, the active reporting may be triggered by an event, or may be performed periodically.

For active reporting triggered by an event, optionally, before step 1, that a trigger condition for the UE to actively report the UE capability may be further included, and the trigger condition includes at least one of:
The UE activates a multi-card operation, for example, activates the second card, the third card, or the like,
where after the UE activates the multi-card operation, a working manner of at least one card is changed, where for example, a card 2 originally works in an LTE network in a single-leg manner, and then an EN-DC manner is activated, or conversely; or
the UE disables at least one card in the multi-card operation.

Optionally, after step 1, that the UE receives a network side acknowledgment message, used for acknowledging that a network side receives or rejects updating of some/all UE capabilities, may further be included.

For example, the network side may indicate a UE capability update, and a UE capability indicated by the network side may be within a range of capability reported in step 1, or may be within a greatest range of capability reported by the UE.

Embodiment 2: A network searches a UE capability.

Step 1: A network side sends a message, used for: searching the UE capability, and triggering reporting of a UE capability update or triggering a UE capability adjustment.

Optionally, the message may be triggered by an event, or may be sent periodically.

For sending triggered by an event, before step 1, that the network side sends a trigger condition for the message may be further included, and the trigger condition includes at least one of:
The network side acquires that the UE activates a multi-card operation, for example, activates the second card, the third card, or the like, where after the UE activates the multi-card operation, the network side needs to change a working manner of at least one card, where for example, a card 2 originally works in an LTE network in a single-leg manner, and then a dual connectivity manner is activated, or conversely.

The network side acquires that the UE disables at least one card in the multi-card operation.

Step 2: The UE sends capability information.

The UE capability may include a TDM pattern+a MIMO capability (lower or higher), a TDM pattern+a CA-related capability, a TDM pattern+a modulation order, and the like, which includes, but is not limited to, a combination of a TDM pattern and a UE capability in a related technology.

Optionally, the UE capability may be a highest capability currently supported by the UE, a capability of the UE suggested by the UE, or a change of the UE capability suggested by the UE.

The network side sends an acknowledgment message, used for acknowledging that a network side receives or rejects updating of some/all UE capabilities.

For example, the network side may indicate a UE capability update, and a UE capability indicated by the network side may be within a range of capability reported in step 1, or may be within a greatest range of capability reported by the UE.

Embodiment 3: UE actively updates/reports a capability on an MCG/SCG.

Step 1: UE configured with dual connectivity actively reports a capability on an MCG/SCG.

The capability on the MCG or SCG includes a TDM pattern+a MIMO capability (lower or higher), a TDM pattern+a CA-related capability, a TDM pattern+a modulation order, and the like, which includes, but is not limited to, a combination of a TDM pattern and a capability of the MCG/SCG of the UE in a related technology.

The capability on the MCG or SCG may be a highest capability currently supported by the MCG or SCG, a capability of the MCG or SCG suggested by the UE, or a change of the capability of the MCG or SCG suggested by the UE.

Optionally, the active reporting may be triggered by an event, or may be performed periodically.

For active reporting triggered by an event, optionally, before step 1, that a trigger condition for the UE to actively report the capability of the MCG or SCG is further included, and the trigger condition includes at least one of:

The UE activates a multi-card operation, for example, activates the second card, the third card, or the like, where after the UE activates the multi-card operation, a working manner of at least one card is changed, where for example, a card 2 originally works in an LTE network in a single-leg manner, and then a dual connectivity manner is activated, or conversely; or the UE disables at least one card in the multi-card operation.

Optionally, after step 1, that the UE receives a network side acknowledgment message, used for acknowledging that a network side receives or rejects updating of some/all UE capabilities related to an MCG or SCG, may further be included.

For example, the network side may indicate an update of a UE capability related to the MCG or SCG, and a capability related to the MCG or SCG indicated by the network side may be within a range of capability reported in step 1, or may be within a greatest range of capability reported by the UE.

Embodiment 4: A network searches a UE capability on an MCG or SCG.

Step 1: A network side sends a message, used for: searching a UE capability related to the MCG or SCG, and triggering reporting of an update of the UE capability related to the MCG or SCG or triggering an adjustment of the UE capability related to the MCG or SCG.

Optionally, the message may be triggered by an event, or may be sent periodically.

For sending triggered by an event, before step 1, that the network side sends a trigger condition for the message may be further included, and the trigger condition includes at least one of:

The network side acquires that the UE activates a multi-card operation, for example, activates the second card, the third card, or the like, where after the UE activates the multi-card operation, the network side needs to change a working manner of at least one card, where for example, a card 2 originally works in an LTE network in a single-leg manner, and then a dual connectivity manner is activated, or conversely.

The network side acquires that the UE disables at least one card in the multi-card operation.

Step 2: The UE sends capability information about the MCG or SCG.

The capability on the MCG or SCG includes a TDM pattern+a MIMO capability (lower or higher), a TDM pattern+a CA-related capability, a TDM pattern+a modulation order, and the like, which includes, but is not limited to, a combination of a TDM pattern and a capability of the MCG/SCG of the UE in a related technology.

The capability on the MCG or SCG may be a highest capability currently supported by the MCG or SCG, a capability of the MCG or SCG suggested by the UE, or a change of the capability of the MCG or SCG suggested by the UE.

Optionally, the network side sends an acknowledgment message, used for acknowledging that a network side receives or rejects updating of some/all UE capabilities related to the MCG or SCG.

For example, the network side may indicate an update of a UE capability related to the MCG or SCG, and a capability related to the MCG or SCG indicated by the network side may be within a range of capability reported in step 1, or may be within a greatest range of capability reported by the UE.

Embodiment 5: UE actively updates/reports capabilities on different bands/at different frequencies.

Step 1: The UE actively reports the capabilities on different bands/at different frequencies after an initial access phase or an access.

The capabilities on different bands/at different frequencies include a TDM pattern+a MIMO capability (lower or higher), a TDM pattern+a CA-related capability, a TDM pattern+a modulation order, and the like, which includes, but is not limited to, a combination of a TDM pattern and UE capabilities on different bands/at different frequencies in a related technology.

The capabilities on different bands/at different frequencies may be a highest capability currently supported by a band/frequency, a capability on a band/at a frequency suggested by the UE, or a change of a capability on a band/at a frequency suggested by the UE.

Optionally, the active reporting may be triggered by an event, or may be performed periodically.

For active reporting triggered by an event, optionally, before step 1, that a trigger condition for the UE to actively report the capabilities on different bands/at different frequencies is further included, and the trigger condition includes at least one of:

The UE activates a multi-card operation, for example, activates the second card, the third card, or the like,
  where after the UE activates the multi-card operation, a working manner of at least one card is changed, where for example, a card 2 originally works in an LTE network in a single-leg manner, and then a dual connectivity manner is activated, or conversely; or
  the UE disables at least one card in the multi-card operation.

Optionally, after step 1, that the UE receives a network side acknowledgment message, used for acknowledging that a network side receives or rejects updating of some/all UE capabilities related to different bands/frequencies, may further be included.

For example, the network side may indicate capability updates on different bands/at different frequencies, and capabilities on different bands/at different frequencies indicated by the network side may be within a range of capability reported in step 1, or may be within a greatest range of capability reported by the UE.

Embodiment 6: A network searches UE capabilities on different bands/at different frequencies.

Step 1: A network side sends a message, used for searching the UE capabilities on different bands/at different frequencies/triggering reporting of an update of the UE capabilities on different bands/at different frequencies/an adjustment of the UE capabilities on different bands/at different frequencies.

Optionally, the message may be triggered by an event, or may be sent periodically.

For sending triggered by an event, before step 1, that the network side sends a trigger condition for the message may be further included, and the trigger condition includes at least one of:

The network side acquires that the UE activates a multi-card operation, for example, activates the second card, the third card, or the like,
  where after the UE activates the multi-card operation, the network side needs to change a working manner of at least one card, where for example, a card 2 originally works in an LTE network in a single-leg manner, and then a dual connectivity manner is activated, or conversely.

The network side acquires that the UE disables at least one card in the multi-card operation.

Step 2: The UE sends capability information on different bands/at different frequencies.

The capabilities on different bands/at different frequencies include a TDM pattern+a MIMO capability (lower or higher), a TDM pattern+a CA-related capability, a TDM pattern+a modulation order, and the like, which includes, but is not limited to, a combination of a TDM pattern and UE capabilities on different bands/at different frequencies in a related technology.

The capabilities on different bands/at different frequencies may be a highest capability currently supported by the UE on different bands/at different frequencies, capabilities on different bands/at different frequencies suggested by the UE, or a change of the capabilities on different bands/at different frequencies suggested by the UE.

Optionally, the network side sends an acknowledgment message, used for acknowledging that a network side receives or rejects updating of some/all the UE capabilities on different bands/at different frequencies.

For example, the network side may indicate capability updates on different bands/at different frequencies, and capabilities on different bands/at different frequencies indicated by the network side may be within a range of capability reported in step 1, or may be within a greatest range of capability reported by the UE.

Through this embodiment of the present disclosure, a problem in a relevant mechanism that UE cannot dynamically update a UE capability is resolved. By using this solution, in a case of a plurality of cards, a UE capability is dynamically and fully used, thereby providing better user experience and system performance.

Figure 4:
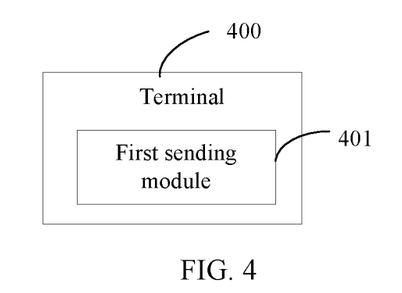
FIG. 4 is a first structural diagram of a terminal according to an embodiment of the present disclosure.

Refer to FIG. 4. FIG. 4 is a first structural diagram of a terminal according to an embodiment of the present disclosure. As shown in FIG. 4, the terminal 400 includes:
  a first sending module 401, configured to send first capability information to a network side device, where the first capability information includes a first capability and time division multiplexing information associated with the first capability.

Optionally, the first sending module 401 is specifically configured to:
  in a case that a first trigger condition is satisfied, send the first capability information to the network side device.

Optionally, the first trigger condition may include at least one of:
  that the terminal activates a multi-card operation;
  that a working manner of N cards in the multi-card operation is changed, in a case that the terminal performs the multi-card operation, where N is a positive integer, and N is less than or equal to number of cards in the multi-card operation;
  that a status of M cards in the multi-card operation is switched to a disabled state, in a case that the terminal performs the multi-card operation, where M is a positive integer, and M is less than or equal to the number of cards in the multi-card operation; or
  that a period for reporting the capability information has arrived.

Optionally, the terminal 400 further includes:
  a first receiving module, configured to: before the first sending module 401 sends the first capability information to the network side device, receive first indication information sent by the network side device.

Optionally, the first indication information is used for:
  searching capability information;
  searching capability update information;
  instructing the terminal to report the capability information;
  indicating that the terminal is allowed to update the capability information; or
  instructing the terminal to update the capability information.

Optionally, in a case that the first indication information is used for instructing the terminal to update the capability information, the first indication information is further used to indicate second capability information expected by the network side device, where the second capability information includes a second capability and time division multiplexing information associated with the second capability.

Optionally, the terminal 400 further includes:
  a second receiving module, configured to: after the first sending module 401 sends the first capability information to the network side device, receive second indication information sent by the network side device.

The second indication information is used for instructing the network side device to accept or reject some or all information in the first capability information.

Optionally, the second indication information is further used for instructing the terminal to perform a capability update operation.

Optionally, after the second indication information sent by the network side device is received, the method further includes:

performing the capability update operation based on the second indication information.

Optionally, the first capability information includes at least one of:

capability information of the terminal;
cell group capability information of the terminal;
working frequency capability information of the terminal; or
working band capability information of the terminal.

Optionally, the first capability includes at least one of: a multi-radio access technology dual connectivity capability; a new radio capability; an evolved universal mobile telecommunications system terrestrial radio access capability; a multi-input multi-output capability; a carrier aggregation capability; or a modulation order capability.

The terminal 400 can implement various processes implemented by the terminal in the foregoing method embodiments of the present disclosure, and achieve the same beneficial effects. To avoid repetition, details are not described herein again.

Figure 5:
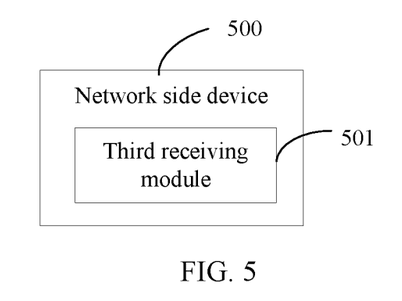
FIG. 5 is a first structural diagram of a network side device according to an embodiment of the present disclosure.

Refer to FIG. 5. FIG. 5 is a first structural diagram of a network side device according to an embodiment of the present disclosure. As shown in FIG. 5, the network side device 500 includes:

a third receiving module 501, configured to receive first capability information sent by a terminal, where the first capability information includes a first capability and time division multiplexing information associated with the first capability.

Optionally, the network side device 500 further includes:

a second sending module, configured to: before the third receiving module 501 receives the first capability information sent by the terminal, send first indication information to the terminal.

Optionally, the second sending module is specifically configured to:

in a case that a second trigger condition is satisfied, send the first indication information to the terminal.

Optionally, the second trigger condition may include at least one of:

that the terminal activates a multi-card operation is acquired;
that a working manner of N cards in the multi-card operation is changed, in a case that the terminal performs the multi-card operation is acquired, where N is a positive integer, and N is less than or equal to number of cards in the multi-card operation;
that a status of M cards in the multi-card operation is switched to a disabled state, in a case that the terminal performs the multi-card operation is acquired, where M is a positive integer, and M is less than or equal to the number of cards in the multi-card operation; or
that a period for delivering the first indication information has arrived.

Optionally, the first indication information is used for instructing any one of the following:

searching capability information;
searching capability update information;
instructing the terminal to report the capability information;
indicating that the terminal is allowed to update the capability information; or
instructing the terminal to update the capability information.

Optionally, in a case that the first indication information is used for instructing the terminal to update the capability information, the first indication information is further used to indicate second capability information expected by the network side device, where the second capability information includes a second capability and time division multiplexing information associated with the second capability.

Optionally, the network side device 500 further includes:

a third sending module, configured to: after the third receiving module 501 receives the first capability information sent by the terminal, send second indication information to the terminal.

The second indication information is used for instructing the network side device to accept or reject some or all information in the first capability information.

Optionally, the second indication information is further used for instructing the terminal to perform a capability update operation.

Optionally, the first capability information includes at least one of:

capability information of the terminal;
cell group capability information of the terminal;
working frequency capability information of the terminal; or
working band capability information of the terminal.

Optionally, the first capability includes at least one of: a multi-radio access technology dual connectivity capability; a new radio capability; an evolved universal mobile telecommunications system terrestrial radio access capability; a multi-input multi-output capability; a carrier aggregation capability; or a modulation order capability.

The network side device 500 can implement various processes that can be implemented by the network side device in the foregoing method embodiments of the present disclosure, and achieve same beneficial effects. To avoid repetition, details are not described herein again.

Figure 6:
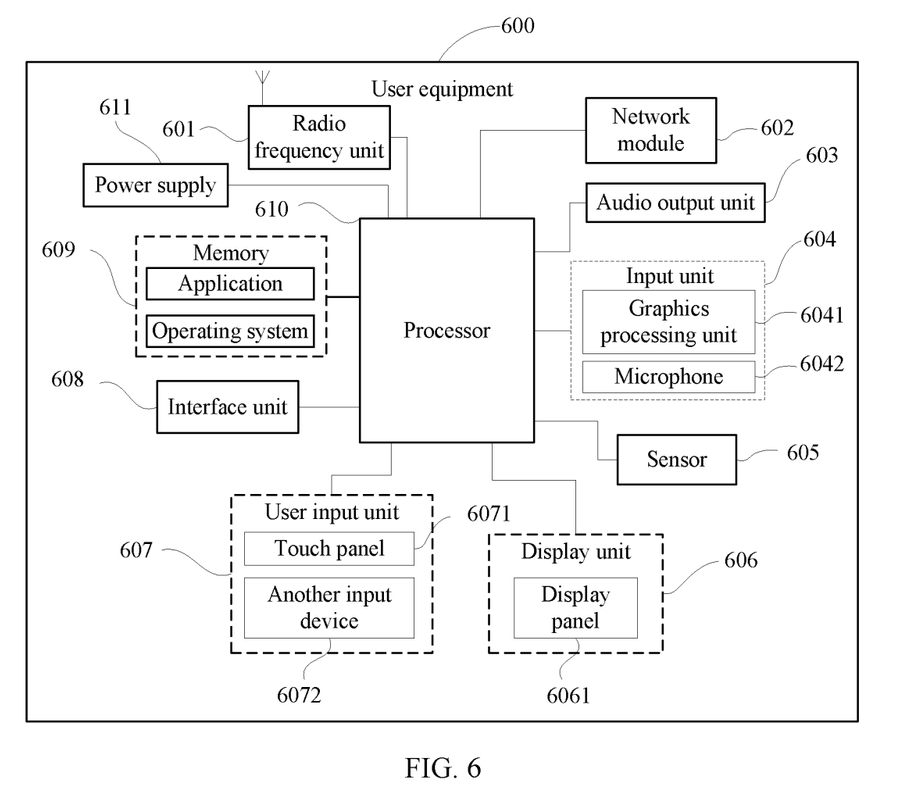
FIG. 6 is a second structural diagram of a terminal according to an embodiment of the present disclosure.

Refer to FIG. 6. FIG. 6 is a second structural diagram of a terminal according to an embodiment of the present disclosure. The terminal may be shown in a schematic diagram of a hardware structure of a terminal implementing the embodiments of the present disclosure. As shown in FIG. 6, the terminal 600 includes but is not limited to: a radio frequency unit 601, a network module 602, an audio output unit 603, an input unit 604, a sensor 605, a display unit 606, a user input unit 607, an interface unit 608, a memory 609, a processor 610, a power supply 611, and the like. A person skilled in the art may understand that the structure of the terminal shown in FIG. 6 does not constitute a limitation on the terminal. The terminal may include more or fewer components than that shown in the figure, or a combination of some components, or a different arrangement of components. In this embodiment of the present disclosure, the terminal includes but is not limited to a mobile phone, a tablet computer, a notebook computer, a palmtop computer, a vehicle-mounted terminal, a wearable device, a pedometer, or the like.

The radio frequency unit 601 is configured to:

send first capability information to a network side device, where the first capability information includes a first capability and time division multiplexing information associated with the first capability.

Optionally, the radio frequency unit 601 is specifically configured to:
in a case that a first trigger condition is satisfied, send the first capability information to the network side device.
Optionally, the first trigger condition may include at least one of:
that the terminal activates a multi-card operation;
that a working manner of N cards in the multi-card operation is changed, in a case that the terminal performs the multi-card operation, where N is a positive integer, and N is less than or equal to number of cards in the multi-card operation;
that a status of M cards in the multi-card operation is switched to a disabled state, in a case that the terminal performs the multi-card operation, where M is a positive integer, and M is less than or equal to the number of cards in the multi-card operation; or
that a period for reporting the capability information has arrived.

Optionally, the radio frequency unit 601 is further configured to:
before the first capability information is sent to the network side device, receive first indication information sent by the network side device.
Optionally, the first indication information is used for:
searching capability information;
searching capability update information;
instructing the terminal to report the capability information;
indicating that the terminal is allowed to update the capability information; or
instructing the terminal to update the capability information.

Optionally, in a case that the first indication information is used for instructing the terminal to update the capability information, the first indication information is further used to indicate second capability information expected by the network side device, where the second capability information includes a second capability and time division multiplexing information associated with the second capability.

Optionally, the radio frequency unit 601 is further configured to:
after the first capability information is sent to the network side device, receive second indication information sent by the network side device.
The second indication information is used for instructing the network side device to accept or reject some or all information in the first capability information.
Optionally, the second indication information is further used for instructing the terminal to perform a capability update operation.
Optionally, the processor 610 is configured to:
performing the capability update operation based on the second indication information.
Optionally, the first capability information includes at least one of:
capability information of the terminal;
cell group capability information of the terminal;
working frequency capability information of the terminal; or
working band capability information of the terminal.
Optionally, the first capability includes at least one of: a multi-radio access technology dual connectivity capability; a new radio capability; an evolved universal mobile telecommunications system terrestrial radio access capability; a multi-input multi-output capability; a carrier aggregation capability; or a modulation order capability.

It should be noted that the foregoing terminal 600 in this embodiment can implement various processes in the foregoing method embodiments in the embodiments of the present disclosure, and achieve same beneficial effects. To avoid repetition, details are not described herein again.

It should be understood that, in this embodiment of the present disclosure, the radio frequency unit 601 may be configured to receive and send information or a signal in a call process. For example, after receiving downlink data from a base station, the radio frequency unit 601 sends the downlink data to the processor 610 for processing. In addition, the radio frequency unit 601 transmits uplink data to the base station. Usually, the radio frequency unit 601 includes but is not limited to an antenna, at least one amplifier, a transceiver, a coupler, a low noise amplifier, a duplexer, and the like. In addition, the radio frequency unit 601 may also communicate with other devices through a wireless communications system and network.

The terminal provides wireless broadband Internet access for the user by using the network module 602, for example, helping the user to send and receive an e-mail, browse a web page, and access streaming media.

The audio output unit 603 can convert audio data received by the radio frequency unit 601 or the network module 602 or stored in the memory 609 into an audio signal, and output the audio signal into sound. In addition, the audio output unit 603 can also provide audio output related to a specific function performed by the terminal 600 (for example, call signal receiving sound or message receiving sound). The audio output unit 603 includes a loudspeaker, a buzzer, a receiver, and the like.

The input unit 604 is configured to receive an audio or radio frequency signal. The input unit 604 may include a graphics processing unit (GPU) 6041 and a microphone 6042. The graphics processing unit 6041 is configured to process image data of a static picture or a video obtained by an image capture apparatus (for example, a camera lens) in a video capture mode or an image capture mode. A processed image frame can be displayed on the display unit 606. The image frame processed by the graphics processing unit 6041 can be stored in the memory 609 (or another storage medium) or sent by using the radio frequency unit 601 or the network module 602. The microphone 6042 may receive a sound and may process such a sound into audio data. The processed audio data may be converted, in a call mode, into a format that can be sent to a mobile communications base station by using the radio frequency unit 601 for output.

The terminal 600 further includes at least one sensor 605, for example, a light sensor, a motion sensor, and another sensor. Specifically, the light sensor includes an ambient light sensor and a proximity sensor, where the ambient light sensor may adjust brightness of a display panel 6061 based on brightness of ambient light, and the proximity sensor may turn off the display panel 6061 and/or backlight when the terminal 600 is moved towards the ear. As a type of the motion sensor, an accelerometer sensor may detect an acceleration value in each direction (generally, three axes), detect a value and a direction of gravity when the accelerometer sensor is static, and may be used in an application for recognizing a mobile terminal posture (such as screen switching between landscape and portrait modes, a related game, or magnetometer posture calibration), a function related to vibration recognition (such as a pedometer or a knock), and the like. The sensor 605 may further include a fingerprint sensor, a pressure sensor, an iris sensor, a molecular sensor, a gyroscope, a barometer, a hygrometer, a thermometer, an infrared sensor, and the like. Details are not described herein.

The display unit 606 is configured to display information entered by a user or information provided for the user. The display unit 606 may include a display panel 6061, and the display panel 6061 may be configured in a form of liquid crystal display (LCD), organic light-emitting diode (OLED), or the like.

The user input unit 607 may be configured to receive input digital or character information, and generate key signal input related to user settings and function control of a terminal. For example, the user input unit 607 includes a touch panel 6071 and other input devices 6072. The touch panel 6071, also called a touch screen, can collect a touch operation of the user on or near the touch panel 6071 (For example, the user uses any suitable object or accessory such as a finger or a stylus to operate on or near the touch panel 6071). The touch panel 6071 may include two parts: a touch detection apparatus and a touch controller. The touch detection apparatus detects a touch position of a user, detects a signal brought by a touch operation, and transmits the signal to the touch controller. The touch controller receives touch information from the touch detection apparatus, converts the touch information into contact coordinates, sends the contact coordinates to the processor 610, and receives and executes a command from the processor 610. In addition, the touch panel 6071 may be implemented by various types such as a resistive type, a capacitive type, an infrared ray type or a surface acoustic wave type. In addition to the touch panel 6071, the user input unit 607 may further include the another input device 6072. For example, the another input device 6072 may include, but is not limited to, a physical keyboard, a function key (for example, a volume control key or a switch key), a trackball, a mouse, and a joystick. Details are not described herein.

Optionally, the touch panel 6071 may cover the display panel 6061. When detecting a touch operation on or near the touch panel 6071, the touch panel 6071 transmits the touch operation to the processor 610 to determine a type of a touch event. Then, the processor 610 provides corresponding visual output on the display panel 6061 based on the type of the touch event. Although in FIG. 6, the touch panel 6071 and the display panel 6061 are configured as two independent components to implement input and output functions of the terminal, in some embodiments, the touch panel 6071 and the display panel 6061 can be integrated to implement the input and output functions of the terminal. Details are not limited herein.

The interface unit 608 is an interface for connecting an external apparatus to the terminal 600. For example, the external apparatus may include a wired or wireless headset jack, an external power supply (or a battery charger) port, a wired or wireless data port, a storage card port, a port for connecting an apparatus having an identification module, an audio input/output (I/O) port, a video I/O port, a headset jack, or the like. The interface unit 608 can be configured to receive an input (for example, data information and power) from the external apparatus and transmit the received input to one or more elements in the terminal 600, or transmit data between the terminal 600 and the external apparatus.

The memory 609 may be configured to store a software program and various types of data. The memory 609 may mainly include a program storage area and a data storage area. The program storage area may store an operating system, an application required by at least one function (for example, a sound playback function and an image playback function), and the like. The data storage area may store data (for example, audio data and an address book) created based on the use of a mobile phone, and the like. In addition, the memory 609 may include a high-speed random access memory, and may further include a nonvolatile memory, for example, at least one disk storage device, a flash memory, or other volatile solid-state storage devices.

The processor 610 is a control center of the terminal, connects various parts of the entire terminal by using various interfaces and circuits, and performs various functions of the terminal and processes data by running or executing software programs and/or modules stored in the memory 609 and invoking data stored in the memory 609, so as to monitor the terminal as a whole. The processor 610 may include one or more processing units. Optionally, the processor 610 may integrate an application processor with a modem processor. The application processor mainly processes the operating system, a user interface, the application program, and the like, and the modem processor mainly processes wireless communication. It may be understood that the foregoing modem processor may not be integrated into the processor 610.

The terminal 600 may further include the power supply 611 (for example, a battery) configured to supply power to various components. Optionally, the power supply 611 may be logically connected to the processor 610 through a power management system, to implement functions such as managing charging, discharging, and power consumption through the power management system.

In addition, the terminal 600 includes some function modules that are not shown, and details are not provided herein.

Optionally, an embodiment of the present disclosure further provides a terminal, including a processor 610, a memory 609, and a computer program stored in the memory 609 and executable on the processor 610, where when the computer program is executed by the processor 610, various processes of the embodiment of the foregoing information processing method are implemented, and the same technical effects can be achieved. To avoid repetition, details are not described herein again.

Figure 7:
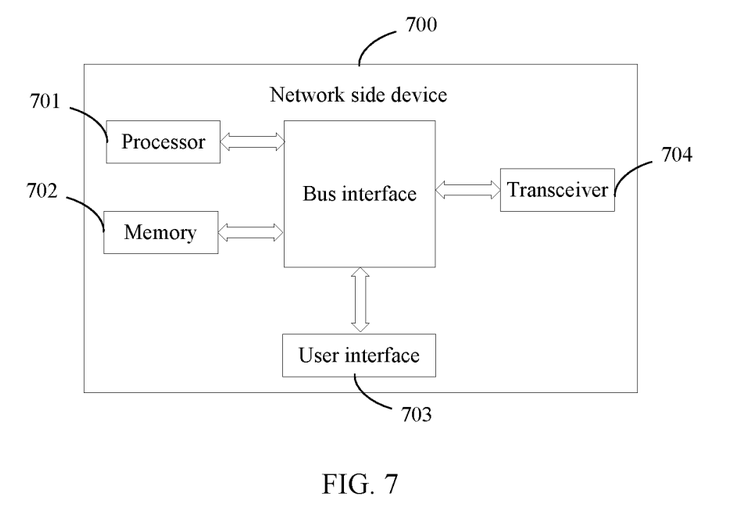
FIG. 7 is a second structural diagram of a network side device according to an embodiment of the present disclosure.

Refer to FIG. 7. FIG. 7 is a second structural diagram of a network side device according to an embodiment of the present disclosure. As shown in FIG. 7, the network side device 700 includes a processor 701, a memory 702, a user interface 703, a transceiver 704, and a bus interface.

In this embodiment of the present disclosure, the network side device 700 further includes a computer program stored in the memory 702 and executable on the processor 701. When the computer program is executed by the processor 701, the following step is implemented:

The transceiver 704 receives first capability information sent by a terminal, where the first capability information includes a first capability and time division multiplexing information associated with the first capability.

In FIG. 7, a bus architecture may include any quantity of interconnected buses and bridges, which are specifically linked together by various circuits of one or more processors represented by the processor 701 and a memory represented by the memory 702. The bus architecture may further connect various other circuits such as those of peripheral devices, voltage regulators, and power management circuits, which are commonly known in the art, and therefore, no further description is given herein. The bus interface provides an interface. The transceiver 704 may be a plurality of components. To be specific, the transceiver 704 includes a transmitter and a receiver, and provides a unit configured to communicate with various other apparatuses on a transmission medium. For different user equipment, the user interface 703 may alternatively be an interface for externally and internally connecting a required device. A connected device includes, but is not limited to, a keypad, a display, a loudspeaker, a microphone, a joystick, or the like.

The processor 701 is responsible for management of a bus architecture and general processing. The memory 702 may store data used when the processor 2601 performs an operation.

Optionally, when the computer program is executed by the processor 701, the following steps may be further implemented:

Before the transceiver 704 receives the first capability information sent by the terminal, the transceiver 704 sends first indication information to the terminal.

Optionally, when the computer program is executed by the processor 701, the following steps may be further implemented:

in a case that a second trigger condition is satisfied, sending the first indication information to the terminal.

Optionally, the second trigger condition may include at least one of:

that the terminal activates a multi-card operation is acquired;

that a working manner of N cards in the multi-card operation is changed, in a case that the terminal performs the multi-card operation is acquired, where N is a positive integer, and N is less than or equal to number of cards in the multi-card operation;

that a status of M cards in the multi-card operation is switched to a disabled state, in a case that the terminal performs the multi-card operation is acquired, where M is a positive integer, and M is less than or equal to the number of cards in the multi-card operation; or that a period for delivering the first indication information has arrived.

Optionally, the first indication information is used for instructing any one of the following:

searching capability information;

searching capability update information;

instructing the terminal to report the capability information;

indicating that the terminal is allowed to update the capability information; or instructing the terminal to update the capability information.

Optionally, in a case that the first indication information is used for instructing the terminal to update the capability information, the first indication information is further used to indicate second capability information expected by the network side device, where the second capability information includes a second capability and time division multiplexing information associated with the second capability.

Optionally, when the computer program is executed by the processor 701, the following steps may be further implemented:

After the transceiver 704 receives the first capability information sent by the terminal, the transceiver 704 sends second indication information to the terminal.

The second indication information is used for instructing the network side device to accept or reject some or all information in the first capability information.

Optionally, the second indication information is further used for instructing the terminal to perform a capability update operation.

Optionally, the first capability information includes at least one of:

capability information of the terminal;

cell group capability information of the terminal;

working frequency capability information of the terminal; or working band capability information of the terminal.

Optionally, the first capability includes at least one of: a multi-radio access technology dual connectivity capability; a new radio capability; an evolved universal mobile telecommunications system terrestrial radio access capability; a multi-input multi-output capability; a carrier aggregation CA capability; or a modulation order capability.

The network side device 700 can implement various processes implemented by the network side device in the foregoing method embodiments. To avoid repetition, details are not described herein again.

An embodiment of the present disclosure further provides a non-transitory computer-readable storage medium. The non-transitory computer-readable storage medium stores a computer program, where when being executed by a processor, the computer program implements various processes of the embodiment of the foregoing information processing method applied to a terminal or network side device, and same technical effects can be achieved. To avoid repetition, details are not described herein. The non-transitory computer-readable storage medium is, for example, a read-only memory (ROM), a random access memory (RAM), a magnetic disk, a compact disc, or the like.

It should be noted that in this specification, the terms "comprise", "include", and any other variants thereof are intended to cover non-exclusive inclusion, so that a process, a method, an article, or an apparatus that includes a series of elements not only includes these very elements, but also includes other elements not expressly listed, or also includes elements inherent to this process, method, article, or apparatus. An element limited by "includes a . . . " does not, without more constraints, preclude the presence of additional identical elements in a process, method, article, or apparatus that includes the element.

Based on the foregoing descriptions of the embodiments, a person skilled in the art may clearly understand that the method in the foregoing embodiments may be implemented by using software in addition to a necessary universal hardware platform, or by using hardware only. In most circumstances, the former is a preferred implementation. Based on such an understanding, the technical solutions of the present disclosure essentially or the part contributing to the related technologies may be implemented in a form of a software product. The computer software product is stored in a storage medium (for example, a ROM/RAM, a magnetic disk, or a compact disc), and includes a plurality of instructions for instructing a terminal (which may be a mobile phone, a computer, a server, an air conditioner, a network device, or the like) to perform the method described in the embodiments of the present disclosure.

The embodiments of the present disclosure are described above with reference to the accompanying drawings, but the present disclosure is not limited to the foregoing specific implementations. The foregoing specific implementations are merely examples instead of restrictions. With enlightenment because of the present disclosure, a person of ordinary skills in the art may derive many forms without departing from the aim of the present disclosure and the protection scope of the claims, all of which shall fall within the protection of the present disclosure.

What is claimed is:

1. An information processing method applied to a terminal, comprising:
sending first capability information to a network side device, wherein the first capability information comprises a first capability and time division multiplexing information associated with the first capability that indicates information related to the first capability on different time domain resources;
wherein the sending first capability information to a network side device comprises:
in a case that a first trigger condition is satisfied, sending the first capability information to the network side device; wherein
the first capability comprises at least one of: a multi-radio access technology dual connectivity (MRDC) capability; a new radio (NR) capability; an evolved universal mobile telecommunications system terrestrial radio access (EUTRA) capability; a multi-input multi-output (MIMO) capability; a carrier aggregation (CA) capability; or a modulation order capability.

2. The method according to claim 1, wherein that the first trigger condition is satisfied comprises at least one of:
that the terminal activates a multi-card operation;
that a working manner of N cards in the multi-card operation is changed, in a case that the terminal performs the multi-card operation, wherein N is a positive integer, and N is less than or equal to number of cards in the multi-card operation;
that a status of M cards in the multi-card operation is switched to a disabled state, in a case that the terminal performs the multi-card operation, wherein M is a positive integer, and M is less than or equal to the number of cards in the multi-card operation; or
that a period for reporting the capability information has arrived.

3. The method according to claim 1, wherein before the sending first capability information to a network side device, the method further comprises:
receiving first indication information sent by the network side device;
wherein the first indication information is used for:
searching capability information;
searching capability update information;
instructing the terminal to report the capability information;
indicating that the terminal is allowed to update the capability information; or
instructing the terminal to update the capability information.

4. The method according to claim 3, wherein in a case that the first indication information is used for instructing the terminal to update the capability information, the first indication information is further used to indicate second capability information expected by the network side device, wherein the second capability information comprises a second capability and time division multiplexing information associated with the second capability.

5. The method according to claim 1, wherein after the sending first capability information to a network side device, the method further comprises:
receiving second indication information sent by the network side device, wherein
the second indication information is used for instructing the network side device to accept or reject some or all information in the first capability information.

6. The method according to claim 5, wherein the second indication information is further used for instructing the terminal to perform a capability update operation;
wherein after the receiving second indication information sent by the network side device, the method further comprises:
performing the capability update operation based on the second indication information.

7. A non-transitory computer-readable storage medium, wherein the non-transitory computer-readable storage medium stores a computer program, and when the computer program is executed by a processor, steps of the information processing method according to claim 1 are implemented.

8. The method according to claim 1, wherein the first capability information comprises at least one of following:
capability information of the terminal;
cell group capability information of the terminal;
working frequency capability information of the terminal; and
working band capability information of the terminal.

9. An information processing method applied to a network side device, comprising:
receiving first capability information sent by a terminal, wherein the first capability information comprises a first capability and time division multiplexing information associated with the first capability that indicates information related to the first capability on different time domain resources; wherein
the first capability information is sent by the terminal to the network side device in a case that a first trigger condition is satisfied; wherein
the first capability comprises at least one of: a multi-radio access technology dual connectivity (MRDC) capability; a new radio (NR) capability; an evolved universal mobile telecommunications system terrestrial radio access (EUTRA) capability; a multi-input multi-output (MIMO) capability; a carrier aggregation (CA) capability; or a modulation order capability.

10. The method according to claim 9, wherein before the receiving first capability information sent by a terminal, the method further comprises:
sending first indication information to the terminal;
wherein the first indication information is used for instructing any one of following:
searching capability information;
searching capability update information;
instructing the terminal to report the capability information;
indicating that the terminal is allowed to update the capability information; or
instructing the terminal to update the capability information.

11. The method according to claim 10, wherein the sending first indication information to the terminal comprises:
in a case that a second trigger condition is satisfied, sending the first indication information to the terminal;
wherein that the second trigger condition is satisfied comprises at least one of:
that the terminal activates a multi-card operation is acquired;
that a working manner of N cards in the multi-card operation is changed, in a case that the terminal performs the multi-card operation is acquired, wherein N is a positive integer, and N is less than or equal to number of cards in the multi-card operation;

that a status of M cards in the multi-card operation is switched to a disabled state, in a case that the terminal performs the multi-card operation is acquired, wherein M is a positive integer, and M is less than or equal to the number of cards in the multi-card operation; or that a period for delivering the first indication information has arrived.

12. The method according to claim 10, wherein in a case that the first indication information is used for instructing the terminal to update the capability information, the first indication information is further used to indicate second capability information expected by the network side device, wherein the second capability information comprises a second capability and time division multiplexing information associated with the second capability.

13. The method according to claim 9, wherein after the receiving first capability information sent by a terminal, the method further comprises:
   sending second indication information to the terminal, wherein
   the second indication information is used for instructing the network side device to accept or reject some or all information in the first capability information.

14. The method according to claim 13, wherein the second indication information is further used for instructing the terminal to perform a capability update operation.

15. The method according to claim 9, wherein the first capability information comprises at least one of following:
   capability information of the terminal;
   cell group capability information of the terminal;
   working frequency capability information of the terminal; and
   working band capability information of the terminal.

16. A terminal, comprising a processor, a memory, and a computer program stored in the memory and executable on the processor, wherein the computer program, when executed by the processor, causes the terminal to perform:
   sending first capability information to a network side device, wherein the first capability information comprises a first capability and time division multiplexing information associated with the first capability that indicates information related to the first capability on different time domain resources;
   wherein the sending first capability information to a network side device comprises:
   in a case that a first trigger condition is satisfied, sending the first capability information to the network side device; wherein
   the first capability comprises at least one of: a multi-radio access technology dual connectivity (MRDC) capability; a new radio (NR) capability; an evolved universal mobile telecommunications system terrestrial radio access (EUTRA) capability; a multi-input multi-output (MIMO) capability; a carrier aggregation (CA) capability; or a modulation order capability.

17. The terminal according to claim 16, wherein that the first trigger condition is satisfied comprises at least one of:
   that the terminal activates a multi-card operation;
   that a working manner of N cards in the multi-card operation is changed, in a case that the terminal performs the multi-card operation, wherein N is a positive integer, and N is less than or equal to number of cards in the multi-card operation;
   that a status of M cards in the multi-card operation is switched to a disabled state, in a case that the terminal performs the multi-card operation, wherein M is a positive integer, and M is less than or equal to the number of cards in the multi-card operation; or
   that a period for reporting the capability information has arrived.

18. The terminal according to claim 16, wherein the computer program, when executed by the processor, causes the terminal to further perform:
   receiving first indication information sent by the network side device;
   wherein the first indication information is used for:
   searching capability information;
   searching capability update information;
   instructing the terminal to report the capability information;
   indicating that the terminal is allowed to update the capability information; or
   instructing the terminal to update the capability information.

19. The terminal according to claim 18, wherein in a case that the first indication information is used for instructing the terminal to update the capability information, the first indication information is further used to indicate second capability information expected by the network side device, wherein the second capability information comprises a second capability and time division multiplexing information associated with the second capability.

20. The terminal according to claim 16, wherein after the sending first capability information to a network side device, the method further comprises:
   receiving second indication information sent by the network side device, wherein
   the second indication information is used for instructing the network side device to accept or reject some or all information in the first capability information.

* * * * *